UNITED STATES PATENT OFFICE.

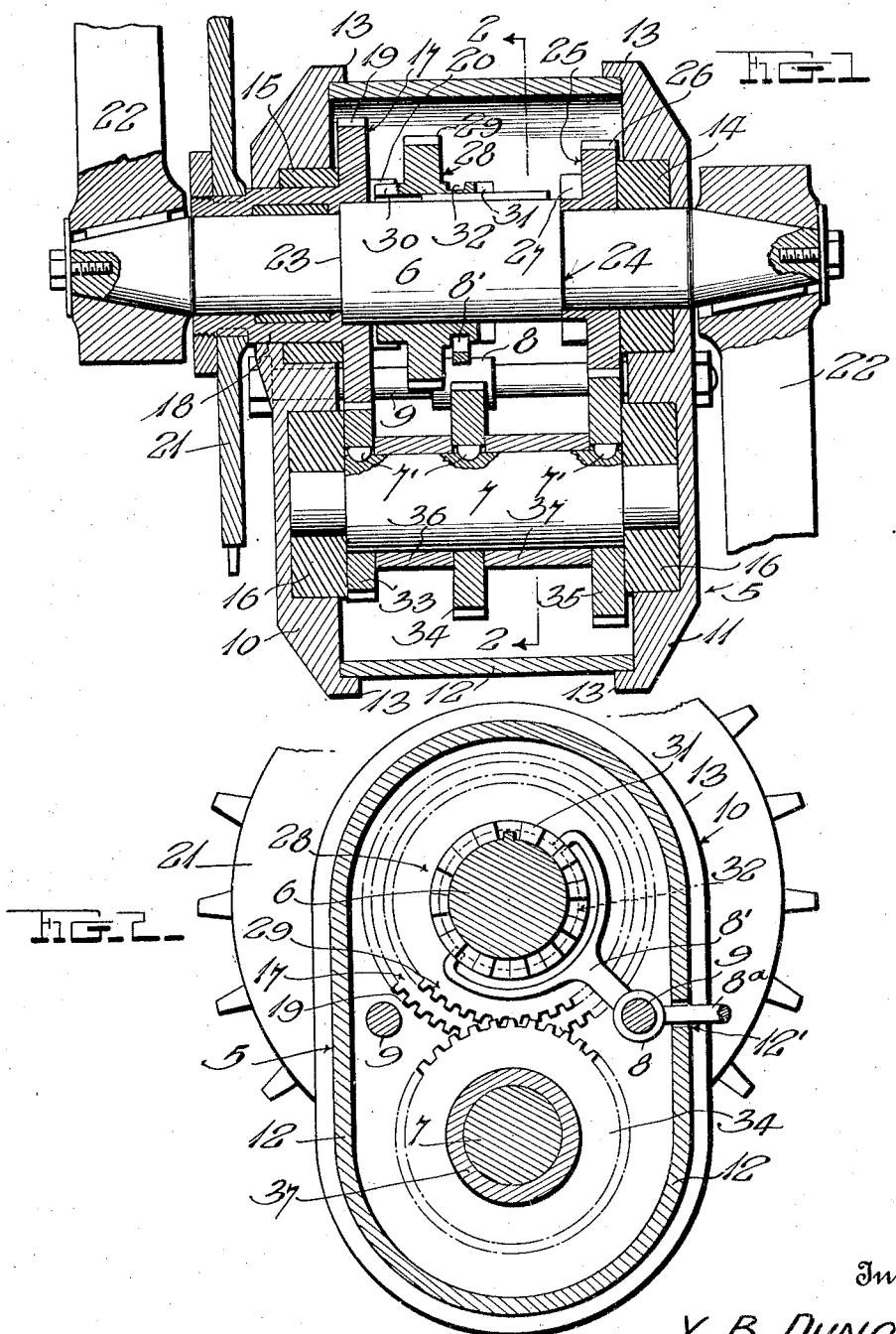

XAVIER B. DUNCAN, OF NEWBERG, OREGON.

VARIABLE-SPEED DEVICE.

1,355,948.  Specification of Letters Patent.  Patented Oct. 19, 1920.

Application filed April 7, 1919. Serial No. 287,932.

*To all whom it may concern:*

Be it known that I, XAVIER B. DUNCAN, a citizen of the United States, residing at Newberg, in the county of Yamhill and State of Oregon, have invented certain new and useful Improvements in Variable-Speed Devices; and I do declare the following to be a full, clear, and exact description of the invention, such as will enable others skilled in the art to which it appertains to make and use the same.

This invention relates to variable speed devices, and it relates more particularly to an improved three-speed gear mechanism for bicycles or other motor driven vehicles.

Another object is to provide an improved device of this character in which a single securing means effects the several functions of uniting the several members of the gear casing in unison, securing the gear wheels in their respective operative positions, and supporting and guiding a shifter clutch actuating device.

Other objects and advantages may become apparent to persons who read the following details of description in connection with the accompanying drawings in which:

Figure 1 is a central vertical section in the plane of the axes of the driving and driven shafts.

Fig. 2 is a vertical sectional view along the line 2—2 of Fig. 1.

Referring to these drawings in detail, in which similar reference characters correspond with similar parts throughout the several views, the device consists broadly of a gear casing 5, a driving shaft 6 and gear wheels carried thereby, a driven shaft 7 and a set of gear wheels thereon, a shifter 8, and a securing means 9, the latter also serving as a support and guide for the shifter.

The casing 5 comprises two casing-heads 10 and 11 and a barrel 12, the latter preferably being somewhat elliptical as illustrated. The casing-heads 10 and 11 are each provided with a flange 13 which fits around the contiguous end of the barrel 12, and one or more of the bolts or securing members 9 may be engaged with the casing-heads as indicated in Fig. 1 so as to co-act with the casing-heads for clamping the barrel 12 and thus to form the unitary gear casing 5, it being understood that one or two nuts may be provided on each bolt 9 so that the casing may be quickly and easily taken apart by the removal of one of the nuts. The casing-heads are provided with suitable recesses for holding bushings or bearing elements 14, 15 and 16 in which the shafts 6 and 7 are journaled. However, the shaft 6 is not in direct contact with the bearing 15, but a combined bearing and transmission member 17 is journaled in the bearing 15, and the shaft 6 is journaled in this member 17. The member 17 comprises a sleeve 18, a gear wheel 19 and a clutch element 20, the outer end of the sleeve 18 being externally screw-threaded to receive a lock nut, and also being provided with a seat on which a sprocket wheel 21 is secured by means of the lock nut.

As this particular embodiment of the invention is intended for use on a pedal operated machine, the shaft 6 has cranks 22 secured thereon by appropriate means, and the middle portion of the shaft 6 is of larger diameter than its end portions, so that shoulders 23 and 24 are provided. The provision of these shoulders not only prevents longitudinal movement of the shaft 6 in its bearings, but also prevents movement of the transmission member 17, it being understood that one side of this transmission member bears against the casing-head 10, while its other side bears against the shoulder 23, it being understood that the bushing 15 constitutes a part of the casing-head 10. Moreover, a transmission member 25 is journaled on the shaft 6, and one of its sides bears against the shoulder 24, while its other side bears against the element 14 of the casing-head 11, so that axial movement of the member 25 is prevented, while this member is permitted to rotate freely on the shaft 6. The member 25 comprises a gear wheel 26 and a clutch element 27.

A combined clutch and gear member 28 is feather-keyed on the middle part of the shaft 6, and thereby secured against rotation relative to the shaft while being shiftable longitudinally of the shaft. This member 28 comprises a gear wheel 29, a clutch element 30 and a second clutch element 31, a peripheral groove 32 being formed in this member 28. The clutch element 30 is inter-engageable with the clutch element 20, and the clutch element 31 is inter-engageable with the clutch element 27, so that the members 17 and 25 are interchangeably operatable by the member 28. The shifter 8 is slidable along the bolt or rod 9 and has a bifurcated arm 8′ which engages with the groove 32, and any appropriate means may be employed for moving the shifter along the rod 9, an arm 8ª being illustrated to show one means whereby the shifter may be actuated from an extraneous source of power, it being noted that a slot or opening 12′ may be provided for permitting the necessary movement of the arm 8ª.

Within the bushings or bearings 16 is journaled the shaft 7, and a set of gears is keyed on this shaft, keys such as indicated at 7′ being preferably employed for this purpose, the small, medium and large gears of this set being indicated by the numerals 33, 34 and 35 respectively. The outer gears 33 and 35 are seated against the elements 16 of the casing-heads, and the intermediate gear 34 is spaced from the outer wheels and secured in this spaced relation by means of sleeves 36 and 37. It will be seen, therefore, that when the parts of the casing are separated, the outer gears 33 and 35 may be quickly and easily removed, whereupon one of the sleeves may be removed and this permits removal of the intermediate gear 34. This construction also enables the device to be manufactured at a comparatively slight cost, as it enables the gears 33, 34 and 35 to be cut from stock bars, while the sleeves 27 may be formed by cutting a cylindrical tube into short sections. It is obvious that such construction is far less expensive than constructions involving wheels having bosses and must be forged and cast and afterward machined to the proper shape and dimensions.

Although two rods 9 are shown in Fig. 2, it is obvious that the invention is not depended upon a number of such rods, and that the rod which is not connected with the shifter is only a subsidiary securing element.

Although I have described this embodiment of my invention very specifically, it is not intended to limit this invention to these exact details of construction and arrangement of parts, but I am entitled to make changes within the scope of the inventive idea disclosed in the foregoing description and following claims.

What I claim as my invention is:

1. In a three-speed gearing mechanism, a rotary driving shaft, a larger gear wheel mounted to rotate freely on the driving shaft, a smaller gear wheel mounted to rotate freely on the driving shaft, a combined clutch and gear member mounted to slide along said driving shaft and being nonrotatable relative to the driving shaft, a set of three gear wheels of different diameters mounted to rotate in unison so that each one will actuate the other two, a transmission member connected to and rotatable by said larger gear wheel, and a shifter operatable to move said combined clutch and gear member interchangeably into clutching engagement with said larger gear wheel and smaller gear wheel and into mesh with one of the gear wheels of said set, the other two gear wheels of said set being in mesh with the said larger and smaller gear wheels respectively.

2. In a gearing mechanism, two casing heads, a barrel, a bolt engaged with the heads and coacting therewith to clamp the barrel so as to form a gear-case, a transmission device comprising a gear wheel and a sleeve, the gear wheel having a clutch member, the sleeve being journaled in one of said heads, a wheel on said sleeve externally of the gear case, a rotary shaft journaled in said sleeve, a combined clutch and gear member slidable longitudinally of said driving shaft and held against rotation relative to the latter, a set of gear wheels of different diameters, rigidly connected together, one of the wheels of said set being in mesh with the gear wheel of the said transmission device, and a shifter operatable to move the said combined clutch and gear member interchangeably into clutching engagement with the clutch member carried by the gear of said sleeve and into mesh with another one of the gear wheels of said set.

3. In a gearing mechanism, two casing heads, a barrel having its ends closed by said casing-heads and combining therewith to form a gear-case, a rotary shaft journaled in the gear case and having its middle part of greater diameter than its end parts and thereby providing shoulders a transmission device comprising a sleeve and a gear wheel on the sleeve provided with a clutch element, said transmission device having one side against said casing and its opposite side against one of said shoulders and being free on said shaft, a second gear wheel free on said shaft, said second gear wheel having one side against said casing and its opposite side against the other one of said shoulders and provided with a clutch element, a clutch member mounted on said shaft and slidable therealong for selective engagement with the clutch elements of the first and second gear wheels, but secured against rotation relative thereto, gear wheels rotatable as a unit arranged to mesh respectively with the first and second said gear wheels, means to shift said combined clutch and gear member into and out of engagement with said transmission device and said second gear wheel, and a securing member engaged with said heads for uniting said barrel with said heads and coacting therewith to prevent axial movement of said shaft and of the said transmission device and transmission member relative to said casing.

4. In a gearing mechanism, a gear-case, a driving shaft journaled in the case and extending longitudinally thereof, a sleeve rotatably positioned about the shaft and extending out of the gear-case and having a gear at its inner end provided with a clutch element, a gear upon the opposite end portion of the driving shaft having a clutch element, a clutch gear slidably mounted upon the driving shaft and having clutch elements for engaging the clutch elements of the first and second mentioned gears when moved longitudinally of the driving shaft, a driven shaft extending longitudinally of the gear-case and having gears rigidly mounted thereon, certain of the gears of the driven shaft being in engagement with the first and second mentioned gears of the driving shaft and another gear carried by the driven shaft being engageable by the sliding gear of the driving shaft when the sliding gear is out of engagement with the first and second-mentioned gears, and means for adjusting the sliding gear upon the driving shaft.

In testimony whereof I have hereunto set my hand.

XAVIER B. DUNCAN.